United States Patent

[11] 3,543,888

[72] Inventor Hans Erdmann
Neu Isenburg, Germany
[21] Appl. No. 782,850
[22] Filed Dec. 11, 1968
[45] Patented Dec. 1, 1970
[73] Assignee Alfred Teves GmbH
Frankfurt/Main, Germany
a corporation of Germany
[32] Priority Dec. 23, 1967
[33] Germany
[31] No. T35,588

[54] SPRING-LOADED BRAKE ADJUSTMENT MECHANISM
10 Claims, 3 Drawing Figs.
[52] U.S. Cl. ................................................. 188/196,
188/73
[51] Int. Cl. ...................................... F16d 65/56,
F16d 55/18
[50] Field of Search .......................................... 188/72-
—73(C), 196(F)(FR), 79.5(GE)

[56] References Cited
UNITED STATES PATENTS
1,659,544 2/1928 Dodge ........................ 188/196(F)UX
3,410,373 11/1968 Pace ............................ 188/196(F)UX

*Primary Examiner*—Duane A. Reger
*Attorney*—Karl F. Ross

ABSTRACT: A brake adjustment mechanism has a rotatable spindle in the form of a hollow bolt braced against the inside of the cylinder and threaded in the brake piston. A torsion compression spring between this spindle and the piston tends to rotate the spindle thereby adjusting the brake. The threads between the spindle and the piston have a limited degree of axial play (equal to the desired brake play); thus only on actuation of the piston far enough to take up this play and pull the spindle away from the cylinder wall can the spring rotate it and adjust the brake. The spring is axially stressed to urge the spindle against the housing or cylinder wall to limit further rotation.

Patented Dec. 1, 1970 3,543,888

INVENTOR.
HANS ERDMANN
BY
Karl F. Ross
ATTORNEY

SPRING-LOADED BRAKE ADJUSTMENT MECHANISM

My invention relates to a spring-loaded adjustment mechanism for a wheel brake, in particular for a fixed saddle hydraulic disk brake.

BACKGROUND OF THE INVENTION

Spring-loaded adjustment mechanisms can be provided with a threaded member on which a spring acts. The piston is threaded so that, on motion of the brake piston beyond a predetermined limit, the spring pushes on the piston thereby causing it to rotate and adjust the brake. These mechanisms present several difficulties.

One of the main difficulties is that the threads on the piston and on the spindle must be very carefully machined to permit good mutual rotation. This is, of course, expensive and not very satisfactory with respect to brake play.

OBJECT OF THE INVENTION

It is, therefore the principal object of my invention to overcome these difficulties and to thereby po provide an adjustment mechanism which is cheaper and simpler than the ones known to date.

SUMMARY OF THE INVENTION

An adjustment mechanism, according to this invention, is provided with a spring whose function is predominantly that of a torsion spring but which applies an axial force between a hollow threaded spindle received within the axially movable piston so as to exert an axial force on the spindle in the direction of a nonshiftable and nonrotatable cylinder wall. In this manner, the whole problem of converting an axial force into rotation of a spindle is obviated, since the spindle is directly rotated by the torsional force generated by the spring.

According to a further feature of my invention, the threads formed between spindle and piston have a predetermined axial play which is equal to that of the desired brake play. Thus, only on axial displacement of the piston, enough to take up this play in the threads, is the spindle moved out of contact with the wall of the cylinder and can the spring rotate the spindle to adjust the brake. A so-called roll-back ring is provided in the cylinder to draw the piston back through the amount of this play in the threads.

These above-described features, and others to be pointed out below, combine to produce an adjustment mechanism which is both exceedingly simple and inexpensive to produce, while being virtually failproof.

BRIEF DESCRIPTION OF THE FIGURES

These and other objects, features and advantages will be described more fully below, reference being made to the drawing in which.

SPECIFIC DESCRIPTION

Figure 1:
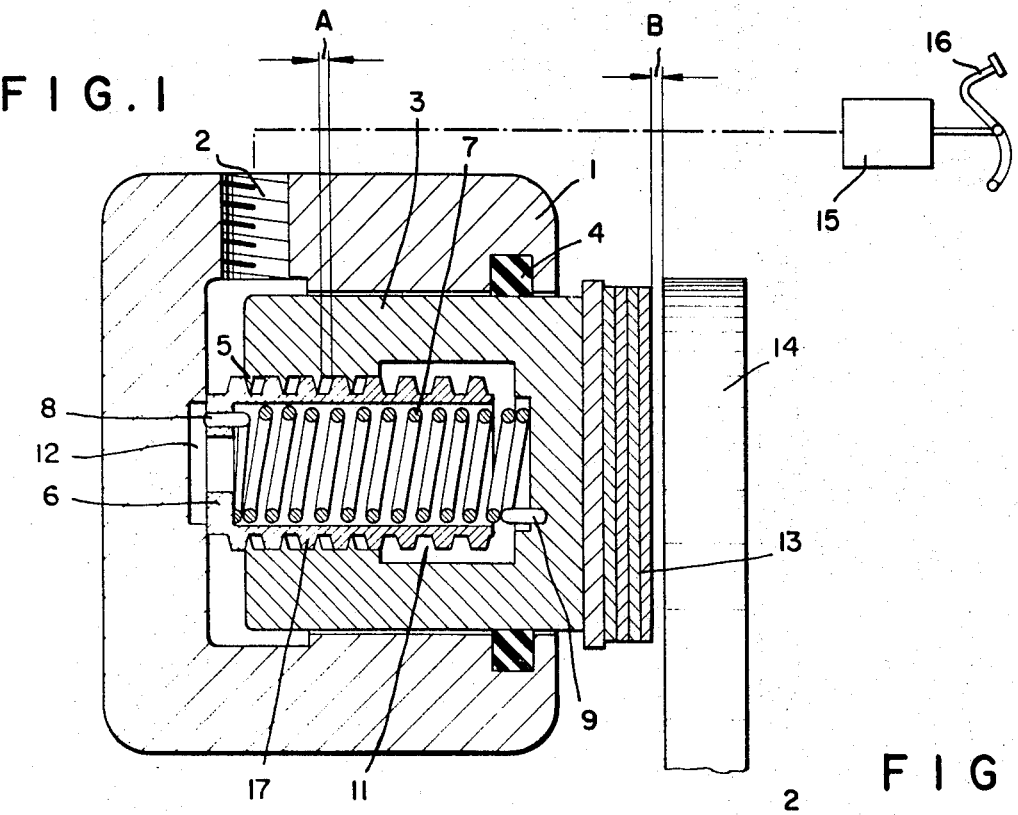
FIG. 1 is an axial cross-sectional view through a brake equipped with the adjustment mechanism according to my invention.

FIG. 1 shows a fixed saddle disk brake having a housing 1 in which a piston 3 is axially displaceable under the effect of hydraulic fluid, fed in through an inlet 2 and the pressure being generated in a master cylinder 15 connected to a brake pedal 16. The piston 3 can force a brakeshoe 13 against a brake disk 14 and is sealed by a roll-back ring 4 which also serves as return means to draw the piston 3 to the left in FIG. 1 to maintain at least a brake play B between the brakeshoe 13 and the disk 14.

The piston 3 has an axial bore 11 and internal threads 5 which are engaged by an externally threaded hollow spindle 6 whose threads 17 are shown in FIG. 1. The threads are of the Acme type. A compression torsion spring 7 in the spindle 5 is anchored in the piston 3 at 9 and in the spindle 6 at 8 and urges this spindle 6 to rotate in a sense tending to force the piston 3 to the right in FIG. 1. The spindle 6 bears against the housing 1 on a clutching surface 12 and, since it is held under the axial force of the prestressed, wound helical coil and compression spring 7, it cannot rotate when in contact with this abutment. The facing surfaces of spindle 6 and housing 1 can be roughened to attain this end.

On actuation of the brake pedal 16 the piston 3 is forced to the right in FIG. 1 and brings the shoe 13 to bear on th the disk 14, after traveling through distance B. On termination of the braking operation the roll-back ring 4 pulls the piston 3 back thereby reestablishing the brake play B.

As shown in FIG. 1, a play A between the threads 17 and 5 exists. Thus, as long as play A is less than or equal to play B, actuation of the brake will not pull the spindle 6 out of contact with the housing 1 thereby allowing it to rotate. But when distance A exceeds distance B, the spindle 6 is pulled out of contact with the housing 1 and the force stored in the spring 7 (as a result of prior winding) serves to rotate it until it once again contacts the housing 1. This action takes up the excess brake play, thereby setting B again equal to A.

Figure 2:
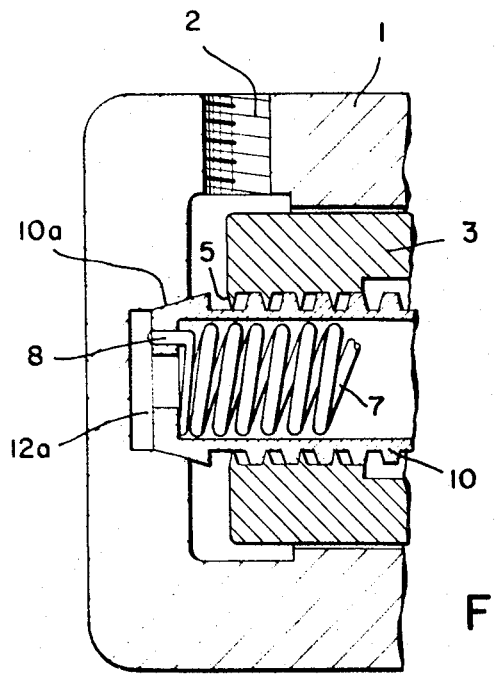
FIG. 2 is a section similar to FIG. 1 showing a second embodiment of my invention.

FIG. 2 shows a portion of a similar brake. Here the housing 1 is formed with a cone-shaped seat 12a in which a cone-shaped end 10a of an adjustment spindle 10 fits. This embodiment ensures a better blocking of the adjustment member 6 when the thread play A is less than or equal to the brake play B.

Figure 3:
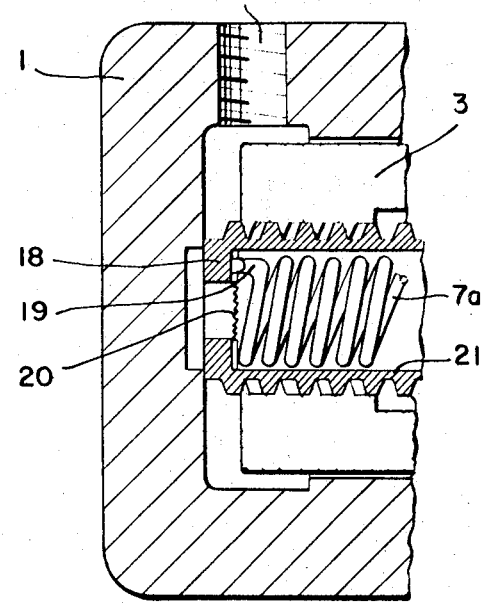
FIG. 3 is a section similar to that of FIG. 1 showing a third embodiment of my invention.

In FIG. 3 an embodiment of my invention is shown wherein the housing and the piston 3 are similar to those in FIG. 1, but where a spring 7 engages ratchetlike teeth 20 of a spindle 18 with an end 19. In this manner the natural rotation of the spring 7a on compression and decompression serves to index the adjustment mechanism by engagement of th the end 19 with the teeth 20. Such a system obviates the necessity of torsionally prestressing the spring which nevertheless is under axial compression. Furthermore, the spindle 18 has a self-locking thread 21 which prevents the brake from going out of adjustment by screwing the spindle 20 back into the piston 3.

The improvement described and illustrated is believed to admit of many modifications within the ability of persons skilled in the art, all such modifications being considered within the spirit and scope of the invention except as limited by the appended claims.

I claim:

1. An adjustment mechanism for a nonrotatable piston axially displaceable in one direction, said mechanism comprising:
    a hollow spindle formed with screw threads and threadedly engaging said piston;
    an abutment fixed in relation to said piston, said spindle bearing on said abutment and being rotatable in one sense to displace said piston in said one direction;
    a torsion spring received in said piston and having one end bearing on said piston and another end engaging said spindle to apply axial force to said spindle in the direction of said abutment, said spring urging said spindle to rotate in said one sense; and
    clutch means permitting said member to rotate in said one sense to adjust said piston upon an axial displacement in said one direction of said piston beyond a predetermined limit.

2. The mechanism defined in claim 1, further comprising an automotive wheel brake having a cylinder receiving said piston, said abutment being formed by a wall of said cylinder having a clutching surface engageable with said spindle, said spindle being nonrotatable in engagement with said surface.

3. The mechanism defined in claim 2 wherein said piston is formed with an axial bore formed with internal threads, said spindle being received in said bore.

4. The mechanism defined in claim 3 wherein said spring is anchored at said one end in said bore to said piston.

5. The mechanism defined in claim 4 wherein said spindle is formed with an axial hollow receiving said spring.

6. The mechanism defined in claim 5 wherein said threads of said piston and of said spindle have a predetermined axial play permitting relative displacement of said piston and said spindle whereby, on axial displacement of said piston greater than said play, said spindle is out of engagement with said clutch surface and is rotatable.

7. The mechanism defined in claim 1, further comprising return means for shifting said piston in the direction opposite to said one direction.

8. The mechanism defined in claim 7 wherein said return means comprises a roll-back ring circumferentially engaging said piston.

9. The mechanism defined in claim 2 wherein said spindle has a substantially cone-shaped end, said clutching surface being a substantially cone-shaped seat receiving said end.

10. The mechanism defined in claim 6 wherein at least said threads of said piston and said spindle are self-locking.